UNITED STATES PATENT OFFICE.

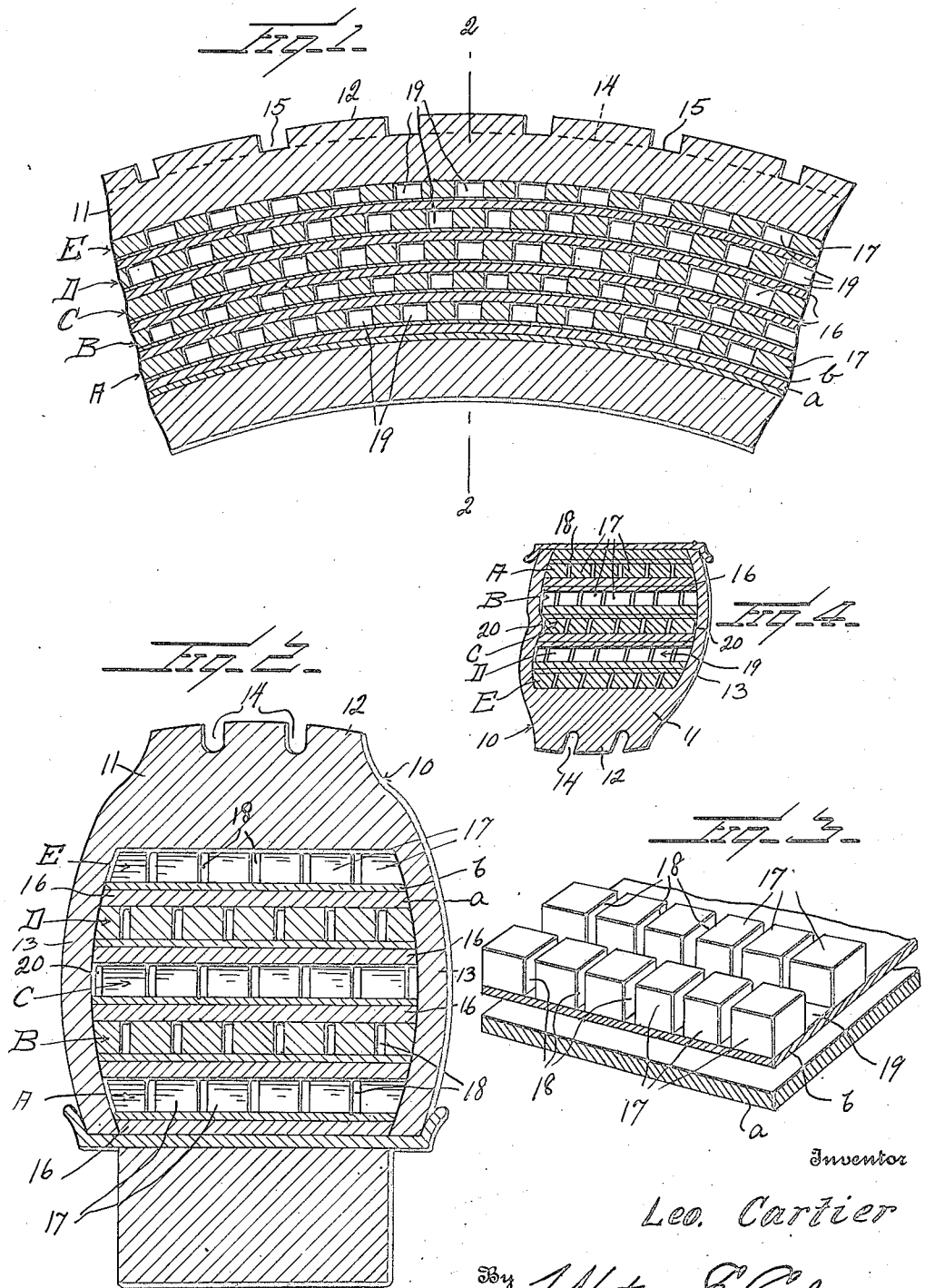

LEO CARTIER, OF OAKLAND, CALIFORNIA.

CUSHION TIRE.

1,403,289. Specification of Letters Patent. Patented Jan. 10, 1922.

Application filed May 15, 1920. Serial No. 381,761.

*To all whom it may concern:*

Be it known that I, LEO CARTIER, a subject of the King of England, residing at Oakland, in the county of Alameda and State of California, have invented certain new and useful Improvements in Cushion Tires, of which the following is a specification, reference being had to the accompanying drawings.
This invention relates to vehicle tires, and particularly to cushion tires of that type known as solid tires to distinguish them from pneumatic tires.

The general object of my invention is the provision of a tire of the character above stated so constructed that the interior of the tire is divided up into a plurality of series of air spaces, the air spaces extending transversely of the tire, and the air spaces of one series being disposed to break joints with the spaces of the next adjacent series so that beneath the air spaces of one series will be disposed solid portions of the next adjacent layer or series.

A further object is to provide a tire of this character including a shoe or casing having a relatively thick tread portion and relatively thin side walls, the interior of the casing being filled with a series of circumferentially extending layers of material formed to provide a series of circumferentially extending plies and between these plies alternate blocks and spaces, the blocks of one layer of material being disposed to break joints with the blocks of an adjacent layer.

A further object is to provide a tire of this character so formed that the tire will yield or flex in going around corners or where the tire is subjected to lateral strain without cracking or breaking the shoe or casing.

Other objects will appear in the course of the following description.

My invention is illustrated in the accompanying drawings, wherein:—
Figure 1 is a longitudinal sectional view of a tire constructed in accordance with my invention;

Figure 2 is a transverse section on the line 2—2 of Figure 1;
Figure 3 is a fragmentary perspective view of one of the layers showing how this layer is formed to provide the alternate blocks and spaces;

Figure 4 is a somewhat diagrammatic cross sectional view showing the manner in which the tire would be deflected, as for instance in rounding a curve.

Referring to these drawings, it will be seen that the tire comprises an outer casing, designated generally 10, and having a relatively thick tread portion 11 formed with a corrugated or toothed tread face 12, the casing being further formed with side walls 13 which are relatively thin. The tread face of this casing may be formed in any suitable manner, but is preferably formed either with circumferentially extending grooves 14, or with these circumferentially extending grooves 14 and additional transverse grooves 15 so as to divide the tread face into a series of relatively large blocks or lugs to secure proper tractive engagement with the ground.

The interior of the casing is filled with alternate series of blocks and plies of rubber of rubberized canvas, duck, or like material. More specifically, I have illustrated the interior of the casing as having therein five plies of material, designated 16, which extend circumferentially around the tire. There are five of these plies indicated, but I do not wish to be limited to the number of these plies. Disposed between these plies and between the outermost ply and the inner face of the tread portion 11 are a series of alternate blocks and spaces.

As illustrated in Figure 3, each ply 16 has attached to it, in a manner which will be later described, a series of blocks 17. These blocks are arranged in a plurality of transverse series, there being relatively small spaces 18 longitudinally between the blocks but there being relatively large spaces 19 between one series of blocks and the next adjacent series of blocks. These blocks 17 may be attached to the ply 16 in any suitable manner, but preferably I form the ply 16 of two sheets of rubber $a$ and $b$, as illustrated in Figure 3. The sheet $a$ may be $\frac{3}{16}''$ thick. The sheet $b$ is $\frac{1}{16}''$ thick and has formed with it or attached to it the block 17. The blocks 17 and the sheet $b$ may be formed by taking a suitable sheet of rubber and pressing or cutting out these blocks therein. However formed, the sheet $b$ is cemented, vulcanized, or otherwise attached to the sheet $a$ so that the ply 16 composed of the sheets $a$ and $b$ is $\frac{1}{4}''$ thick, while the blocks, roughly speaking, are approximately $\frac{5}{8}''$ thick. Thus the combined thickness of the ply 16 and the blocks is $\frac{7}{8}''$. These plies 16 with their attached blocks 17 are disposed in successive layers within the casing. I have illustrated five of these combined layers, designated A, B, C, D and E. Of course, there may be more or less layers as desired.

It will be seen from Figure 1 that blocks 17 of one layer are arranged to break joints or arranged in staggered relation to the blocks 17 of a next adjacent layer. Thus the blocks 17 of one layer are disposed longitudinally to bridge and extend over the space 19 of the next adjacent inner or outer layers, and it will be seen from Figure 1 that the spaces 19 between the rows of blocks 17 are less in length than the length of the blocks so that the block 17 of one layer extends over the space 19 of the layer below, and the ends of the blocks 17 overlap slightly the ends of the blocks 17 of the layer below. Considering the transverse section of the tire, such as shown in Figure 2, it will be seen that the blocks 17 of one layer are so disposed with reference to the blocks of the next adjacent layer that the spaces 18 of one layer are in line with the middle of a block of the layer below or above. In other words, transversely considered, the blocks 17 of one layer break joints with the blocks 17 of the next adjacent layers. Thus a plurality of air spaces or cells are formed in the tire, certain of these spaces, as for instance the spaces 19, extending transversely entirely across the casing, while certain other of the spaces, that is the spaces 18, extend longitudinally of the casing.

All of the five layers A, B, C, D and E are of like construction, and it will be seen that each layer of blocks is separated from the next layer of blocks by a sheet 16 of imperforate material. Though I do not wish to be limited to any particular size for these spaces and blocks, preferably the blocks 17 will be longer for any one layer than the blocks 17 of the inner layers. This will, of course, affect the spaces between the blocks. Thus the spaces between the blocks of the layer E or outermost layer will be $\frac{9}{16}''$. The spaces between the longitudinal successive blocks of the layer D will be slightly less than $\frac{9}{16}''$, the longitudinally extending spaces between the blocks 17 of the layer C will be $\frac{1}{2}''$, the longitudinally extending spaces between the blocks of the layer B will be $\frac{7}{16}''$, and the spaces between the blocks of the layer A will be approximately $\frac{3}{8}''$. It will thus be seen that the length of the spaces and, therefore, the length of the blocks will decrease inward. The thickness of the several layers may vary in the same manner, or all of the layers may have the same thickness. Thus the particular dimensions of the blocks and spaces, or the dimensions of the blocks and spaces of the outer layers relative to the inner layers may be varied, and the thickness of the layers may be varied as well as the thickness of the sheet 16. It will be seen, therefore, that the dimensions given are purely for illustrative purposes.

Preferably the blocks or teeth 12 formed upon the circumference of the tire will be $2\frac{1}{2}''$ long, with a space of approximately $\frac{1}{2}''$ between each block. The side wall of the casing will preferably be $\frac{3}{8}''$, while the tread portion will be preferably $4''$ wide, the total depth of the tire being $4\frac{3}{8}''$. Of course, these dimensions also are purely illustrative and may be varied.

It will be noted that at the middle of the side walls of the tire a space 20 is left, which space is continuous circumferentially of the tire. These longitudinally extending recesses or spaces 20 will give a flexibility to the tire which it otherwise would not have so that the tire will yield and conform properly to the road and a proper cushioning action will result. These spaces adjacent the side walls of the casing will give a chance for the side wall to bend into the spaces. If the tire should strike a hump in the road, or if the machine should be turning, the tire will be deflected slightly, as illustrated in Figure 4, by reason of these spaces 20, but as soon as the car is moving straight forward, the tire will come back to its normal position. It is to be understood, of course, that the plies 16 of one layer are cemented to the blocks of the next innermost layer and this will permit the filler and the tire to yield laterally without slipping. Thus the tire can give laterally, as before remarked, and the space 20 permits the side wall of the tire to give under these circumstances, and by the provision of these spaces 20, I prevent the side wall of the tire from cracking at this point.

It will be seen that with this tire and under all circumstances pressure on any air space or air pocket 19 will be supported by a solid portion of rubber immediately beneath it and thus these spaces 19 and the spaces 18 will form air cushions giving the proper resilience or cushioning effect to the tire. Furthermore, the longitudinally extending spaces 18 will give a lateral flexibility to the tire which it otherwise would not have.

I do not wish to be limited to any particular means for making the tire or forming the several layers, but it is my design to form the sheet $b$ with its alternate blocks 17 by pressing or rolling the sheet and the blocks out from an integral sheet of rubber. While the filler formed by the plies 16 and the blocks 17 carried thereby will not ordinarily be cemented within the shoe or casing 13, I do not wish to be limited to this, as it is obvious that this filler might be cemented within the casing.

I claim:—

1. A tire consisting of an outer casing and a filler for the interior of the tire comprising a plurality of layers of elastic material, each layer being formed to provide an imperforate ply and rectangular blocks attached to the ply, the blocks being spaced from each other on all sides, the blocks of one layer being disposed immediately above the spaces between said blocks of a next adjacent layer.

2. A tire of the class described comprising an outer casing and a filler, the filler being composed of a plurality of circumferentially extending, imperforate, elastic strips and intermediate elastic blocks, the blocks being rectangular and being separated from each other on all sides to provide air pockets, the blocks of one layer being disposed in radial alignment with the air pockets of a next adjacent layer.

3. A tire of the class described comprising an outer casing and a filler, the filler being composed of a plurality of circumferentially extending, imperforate, elastic strips having upon their faces a series of rectangular blocks spaced from each other on all sides, the spaces between said blocks constituting air cells, the blocks of one layer being disposed in radial alignment with the air cells of a next adjacent layer, the blocks of any relatively outer layer being longer than the air cells of any relatively inner layer, and the blocks of one layer being disposed in radial alignment with the air cells of the next adjacent layers.

4. A tire of the class described comprising an outer casing and a filler, the filler comprising a series of layers, each layer consisting of an imperforate, circumferentially extending strip and a plurality of transverse series of blocks disposed upon and attached to the face of the strip, the blocks of each series being spaced from each other by relatively narrow spaces, the blocks of one series being spaced from the blocks of the next adjacent series by a relatively wide, transversely extending space, the layers being so disposed within the casing that the blocks of one layer are in radial alignment with the spaces of the next adjacent layer, the blocks of any layer having a length greater than the spaces of the next innermost layer.

5. A tire of the character described comprising an outer casing and a filler, the filler being composed of a plurality of layers, each layer consisting of a circumferentially extending, imperforate strip having a plurality of transversely extending series of elastic blocks attached to the strip, the blocks of each series being spaced from each other by relatively narrow, longitudinally extending spaces, and the blocks of one series being spaced from the blocks of an adjacent series by a relatively wide, transversely extending space, the layers being so disposed that the blocks of one layer are in alignment with the spaces of the next adjacent layers, the blocks of any layer being longer than the spaces beneath that layer, said layers being cemented to each other.

6. A tire of the class described comprising an outer casing and a filler, the filler comprising a series of layers, each layer consisting of an imperforate, circumferentially extending strip and a plurality of transverse series of blocks disposed upon and attached to the face of the strip, the blocks of each series being spaced from each other by relatively narrow spaces, the blocks of one series being spaced from the blocks of the next adjacent series by a relatively wide, transversely extending space, the layers being so disposed within the casing that the blocks of one layer are in radial alignment with the spaces of the next adjacent layer, the blocks of any layer having a length greater than the spaces of the next innermost layer, a layer midway between the inner and the tread portion of the casing of the tire having its blocks so arranged as to leave a circumferentially extending space between the blocks and the side wall of the casing permitting the casing to bend inward at this point.

In testimony whereof I hereunto affix my signature.

LEO CARTIER.